United States Patent [19]
Patterson et al.

[11] Patent Number: 6,079,698
[45] Date of Patent: Jun. 27, 2000

[54] ISOLATION SYSTEM FOR VIBRATORY EQUIPMENT

[75] Inventors: Harold E. Patterson, Indiana; Paul I. Sleppy, Penn Run; Kenneth M. Marshall, Indiana, all of Pa.

[73] Assignee: FMC Corporation, Chicago, Ill.

[21] Appl. No.: 08/912,492

[22] Filed: Aug. 18, 1997

[51] Int. Cl.⁷ .................................................. F16F 3/10
[52] U.S. Cl. ................................. 267/33; 267/136
[58] Field of Search .................................. 248/638, 619, 248/632, 624, 562; 267/33, 3, 70, 71, 73, 74, 136

[56] References Cited

U.S. PATENT DOCUMENTS

| | | | |
|---|---|---|---|
| 2,319,735 | 5/1943 | Hussman | 267/135 |
| 2,605,099 | 7/1952 | Brown | 267/33 |
| 3,155,853 | 11/1964 | Spurlin et al. | 267/165 |
| 3,223,400 | 12/1965 | Deister | 267/152 |
| 3,762,694 | 10/1973 | MacDonnel | 267/3 |
| 4,313,535 | 2/1982 | Carmichael | 198/766 |
| 5,667,202 | 9/1997 | Gwinn | 267/33 |

FOREIGN PATENT DOCUMENTS

| | | | |
|---|---|---|---|
| 623799 | 8/1961 | Italy | 267/33 |
| 245565 | 1/1926 | United Kingdom | 267/33 |
| 979443 | 1/1965 | United Kingdom | 267/33 |

*Primary Examiner*—Matthew C. Graham
*Attorney, Agent, or Firm*—Rockey, Milnamow & Katz, Ltd.

[57] ABSTRACT

An isolation component for vibratory equipment such as a vibratory trough or feeder includes an isolation spring for supporting the dynamic load of the equipment, and a damper element, preferably an elastomeric ring, arranged against an end of the isolation spring. The damper element prevents excessive motion of the isolation spring due to the vibratory equipment's operating frequency being close to any of the natural frequencies of the bending mode of the isolation spring by applying an opposing load to any such motion. The damper element is preferably an elastomer ring and is arranged along an axis of the support spring. A connector extends from a first end of the isolation spring, adjacent the damper element, toward and past a second end of the isolation spring and is connected to the vibratory equipment. The second end of the isolation spring is supported by a housing supported by external structure such that the weight and dynamic load of the equipment compresses and expands the isolation spring, and excessive expansion of the support spring acts on damper element which is braced against the housing.

19 Claims, 5 Drawing Sheets

ISOLATION SYSTEM FOR VIBRATORY EQUIPMENT

FIELD OF THE INVENTION

The present invention relates to an isolation system used with vibratory feeders and conveyors. Particularly, the invention relates to a system for damping unwanted motion of an isolation spring member without adversely affecting the efficiency of the system to minimize the transmission of vibratory forces to the equipment's support structure. The invention also particularly relates to an isolation system for mechanically excited vibratory equipment, where feed rate is reduced or stopped by changing the operating frequency of the mechanical exciter.

BACKGROUND OF THE INVENTION

Vibratory feeders and conveyors are installed onto an equipment support structure usually within a building structure. Vibratory feeders and conveyors utilize some form of isolation system to minimize the transmission of unwanted vibratory forces to the equipment support structure, and to the building structure in which it is installed. Without the isolation system, the building and equipment support structures would vibrate from the transmitted forces, creating high noise levels and undesirable working conditions. If a structural member, or structural assembly, associated with the support structure of the vibratory feeder or conveyor has a natural frequency near the operating frequency of the vibratory feeder or conveyor, or near a harmonic of the operating frequency, the amplitude of the vibration could possibly reach detrimental levels.

Typical isolation systems consist of a soft spring element to absorb the vibratory energy, and a structural means to support or suspend the equipment from the spring element. Generally, the spring element is a steel coil, steel or reinforced plastic leaf, block of rubber, or an air filled rubber sphere or cylinder. The spring element design is selected depending on the isolation characteristics of the vibratory feeder or conveyor and the economics of the particular design. For example, a steel coil spring is strong, but can be designed to have a soft spring rate in its vertical axis, and thus might be selected as an economical means to isolate vibratory forces that have large vertical components, and where heavy static loads are involved. On the other hand, a coil spring is relatively large, heavy, and because steel is very lightly damped, is sensitive to vibratory motion over a broad frequency range. Such a broad frequency range can be a problem if the frequencies happen to be close to a frequency of one of the natural vibration modes of the coil spring.

Rubber springs are often chosen because they are lighter, dimensionally smaller for a given spring rate, and more highly damped. However, it is often more difficult to design a rubber spring block to have an equally low spring rate because of design constraints limiting deflection, particularly in compression. Therefore, the design compromises in using a rubber spring block may be that the vertical isolation is less efficient, for example. Also, the rubber spring isolator tends to be more costly for a given spring rate due to a higher cost manufacturing and quality control process.

The problems associated with isolation systems are often compounded by the way in which users select equipment, install the equipment, and then operate their production processes using the equipment. Many processes require frequent stopping and starting of the equipment. This can create a problem for fixed frequency, mechanically excited vibratory equipment, as the frequent switching on and off could cause the electric motor to overheat, and perhaps to prematurely fail. In order to prevent such problems from occurring, rather than turning the machine's electrical supply off to stop the conveying, many users reduce the operating speed of the equipment to a level where the material being fed is no longer conveyed.

This reduction in speed might be accomplished with the use of a variable frequency motor controller, the output frequency of which can be switched from the normal line frequency to a lower frequency on demand. This is usually accomplished by an output from a sensor that is monitoring various downstream process parameters such as feed rate, flow depth, etc. In the case of two mass feeders and conveyors, the controller might be a voltage control device, switching voltage output to the motor, between a supply line voltage level, and a lower voltage level, to effectively change the motor speed and thus control the feed rate.

Unfortunately, while a two speed operating level reduces process equipment problems, reducing to the lower frequency can create a problem for the isolation system. The reduced frequency may sometime be close in frequency to the natural frequency of the isolation springs, causing large vibration amplitudes of the undamped spring, noise, wear or failure of the isolation system components. It is also possible that such low frequency vibratory forces transmitted through the support structures can cause the isolator springs on adjacent feeders to also resonate through sympathetic excitation, even if their associated vibration equipment is turned off. Very little energy is required to produce high amplitude motion of a typical undamped steel isolator spring, if the transmitted frequencies are close to any of the natural frequencies of the bending mode of the spring.

When vibratory equipment is installed, especially cable suspended equipment, it is sometimes difficult to get the trough member to be perfectly level with respect to a horizontal reference plane. While floor mounted isolation support members can be varied in elevation using leveling plates (shimmied-up) to become level, it is more difficult to level suspended equipment without adding turnbuckles or the like in the suspension cable. Turnbuckles, and other cable length adjusting mechanisms, are effective at leveling, but add mass to the cable system, lowering its natural frequency to be within the range of the equipment's operating frequencies, which can make the cable's whip or become noisy.

SUMMARY OF THE INVENTION

The present invention provides an improved isolation suspension system for a vibrating machine such as a vibrating feeder or conveyor. The system includes one or more suspension assemblies supporting portions of the machinery. The suspension assembly includes a housing holding an isolation spring or support spring, and a damping spring or damper element. The isolation spring preferably is a coil spring and the damping spring is an elastomer ring. The damper element acts in conjunction with the isolation spring. The isolation spring supports the vertical superimposed dynamic forces of the feeder or conveyor and deflects in compression a short distance. The damper element prevents unwanted motion of the isolation spring due to the vibratory equipment operating frequency being close to any of the natural frequencies of the isolation spring's bending modes, by applying an opposing load to any such motion.

The preferred embodiment suspension assembly can be provided as a hanger component or a support component.

The hanger component provides an isolation spring compressible and expandable along an axis of the spring, and a damper element or damping spring arranged adjacent one end of the isolation spring to impart a resilient force against expansion of the isolation spring. The isolation spring is preferably a coil spring and the damper element is an annular elastomeric block arranged to resiliently oppose excessive amplitude of the isolation spring. The damper element is braced against stationary structure to oppose elongation of the isolation spring. The damper element can be braced against an overlying housing, which is hung from a cable, rod or wire rope, to oppose elongation of the isolation spring. In the hanger component embodiment, the isolation spring and the damper element are arranged in an opposing spring circuit.

The support component provides an isolation spring compressible and expandable along an axis of the spring, and a damper element or damping spring arranged adjacent a top end of the isolation spring and extending downwardly, either outside or inside the isolation spring, to be supported with the isolation spring. The damping spring is preferably in the form of an elastomeric cylinder which opposes excessive amplitude of the isolation spring by opposing compression of the isolation spring. In the support component embodiment, the damper element and the isolation spring are arranged in a parallel spring circuit.

It is encompassed by the invention that the hanger component can be reconfigured as a parallel spring circuit, and the support component can be reconfigured as an opposing spring circuit.

In either configuration the damper element prevents unwanted motion of the isolation spring due to the vibratory equipment's operating frequency. Also, the vertical spring rate of the isolation spring is virtually unaffected by the application of the damper element, maintaining vertical isolation efficiency.

Other features and advantages of the present invention will become readily apparent from the following detailed description, the accompanying drawings, and the appended claims.

DETAILED DESCRIPTION OF THE PREFERRED EMBODIMENTS

Figure 1:
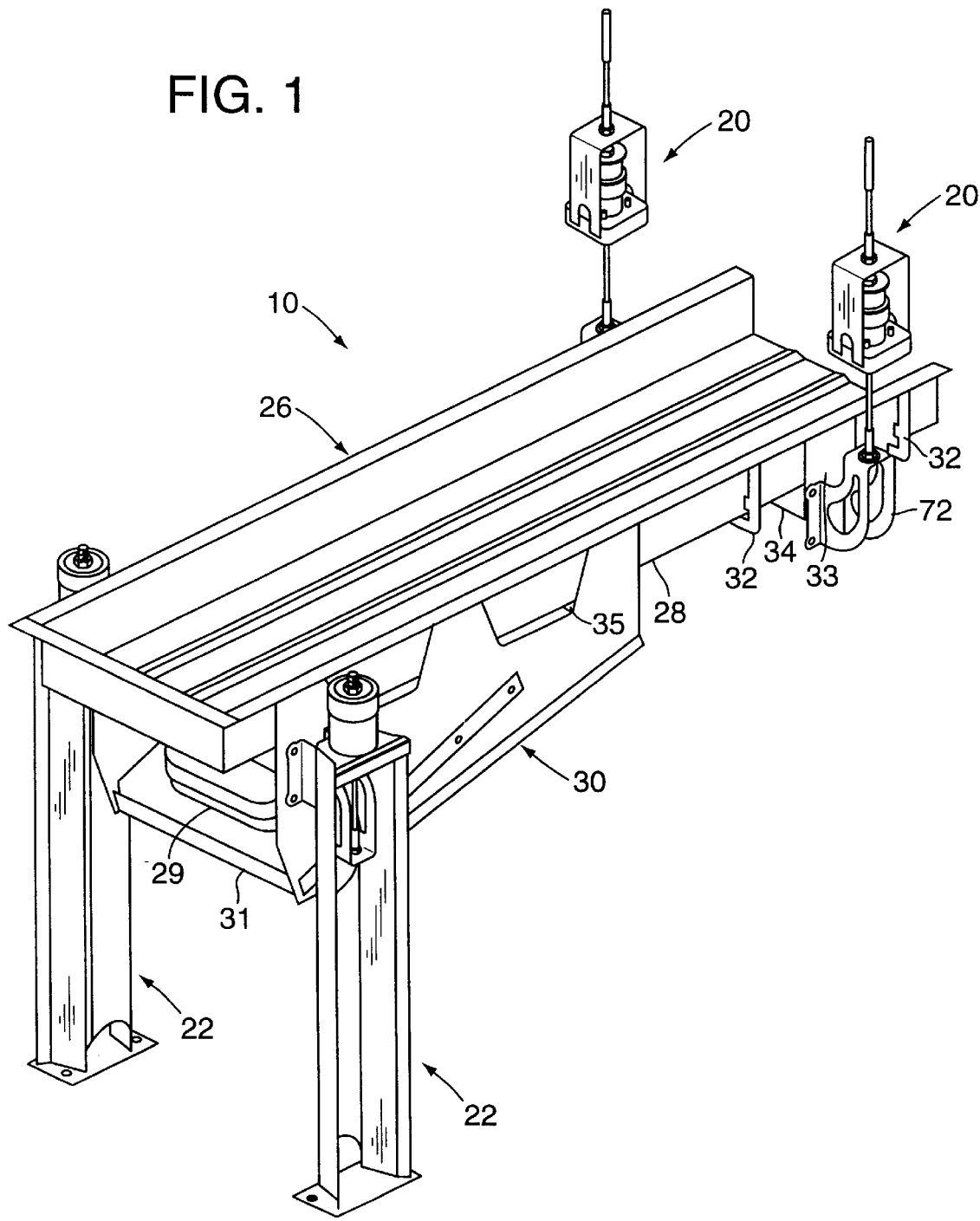
FIG. 1 is a perspective view of a vibratory conveyor incorporating an isolation suspension system of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring to FIG. 1, a vibratory conveyor assembly 10 is described. The assembly includes suspended isolation assemblies or hanger components 20 and base mounted isolation assemblies or support components 22, which together support a trough 26. Wing plate assemblies 30 are welded on each side of the conveyor trough member 26 as are the isolation system mounting plates 33. The support and stiffening rib member 34 passes under the trough 26 and is welded between the isolation system mounting plates 33. A similar support and stiffening rib member 35 is connected between the wing plate assemblies 30. Together with the transverse stiffening ribs 32, the members 30, 35 and 34 provide rigidity and strength for the trough 26 to prevent unwanted bending motion and fatigue failure from the applied vibratory excitation. In the FIGURE, an electromagnetic exciter 29 is shown connected between the wing plate assemblies 30 by means of an exciter mounting bracket 31.

Figure 2:
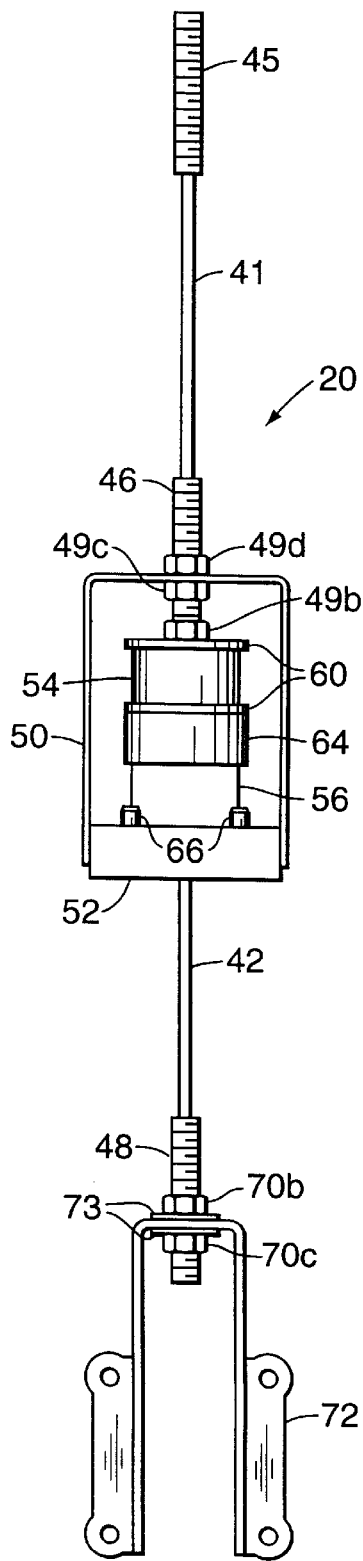
FIG. 2 is a front elevational view of a hanger component of the suspension system.
Figure 3:
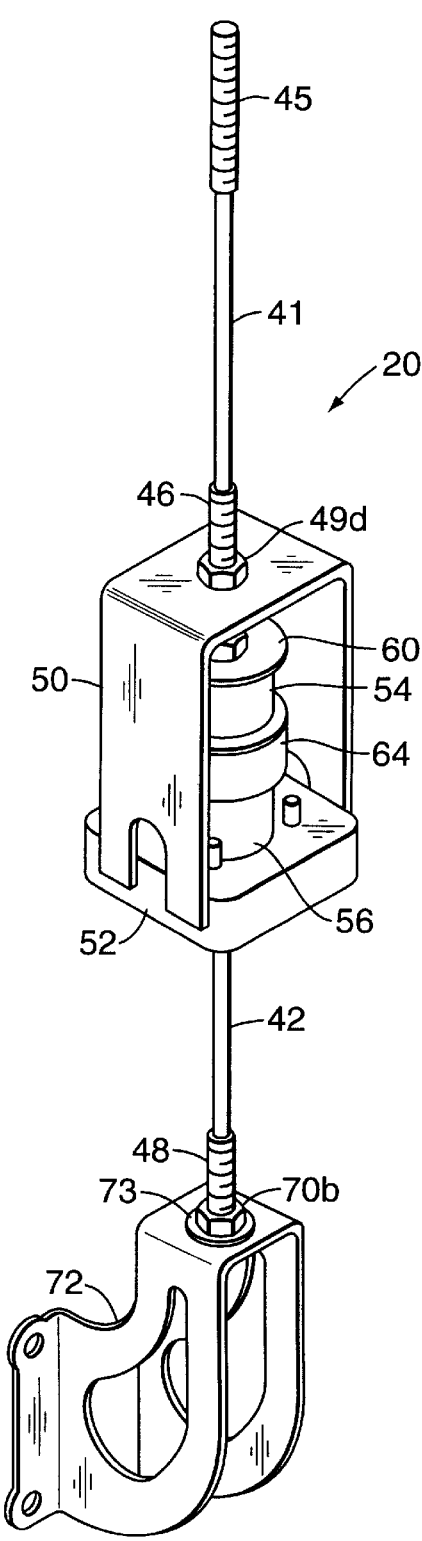
FIG. 3 is a perspective view of the hanger component of FIG. 2.

FIGS. 2 and 3 illustrate the hanger component 20 of the present invention which includes wire rope segments 41, 42, respectively connected between threaded metal ferrules 45, 46, and between threaded metal ferrules 47, 48. The metal ferrules 45, 46 are connected to each end of the wire rope segment 41, by swaging the wire ropes into the ferrules, or by other suitable means. The metal ferrules 47, 48 are connected to each end of the wire rope segment 42 in similar fashion. Adjusting and fastening nuts 49a–d are used on the threaded metal ferrules 46 to connect the wire rope segment 41 to a bale frame 50. The bale frame 50 in combination with a bale weight 52, forms a housing to support an elastomer damper element 54, and an isolation spring 56.

Compression washers 60 are placed on a top and bottom face of the elastomer damper spring element 54. The compression washers 60 are sized for load spreading and are preferably composed of stainless steel.

The isolation spring 56 can be a steel coil. An elastomer protective boot 64 is placed over the isolation spring 56. The isolation spring is centered in the bale 50, by means of centering pins 66, inserted in the bale weight 52 and protruding therefrom. The centering pins 66 are equally spaced about the spring's vertical axis in order to center the steel coil isolation spring 56 on the bale weight 52, when the isolation spring 56 is placed within the nest thus formed by the centering pins 66.

The upper metal ferrule 47 is connected to the lower compression washer 60 by means of a fastener nuts 70a. The lower metal ferrule 46 is fastened to a conveyor isolation connecting bracket 72 by means of fastening nuts 70b, 70c and washers 73. The conveyor isolation connecting bracket 72 is bolted to the isolation system mounting plates 33.

Figure 6:
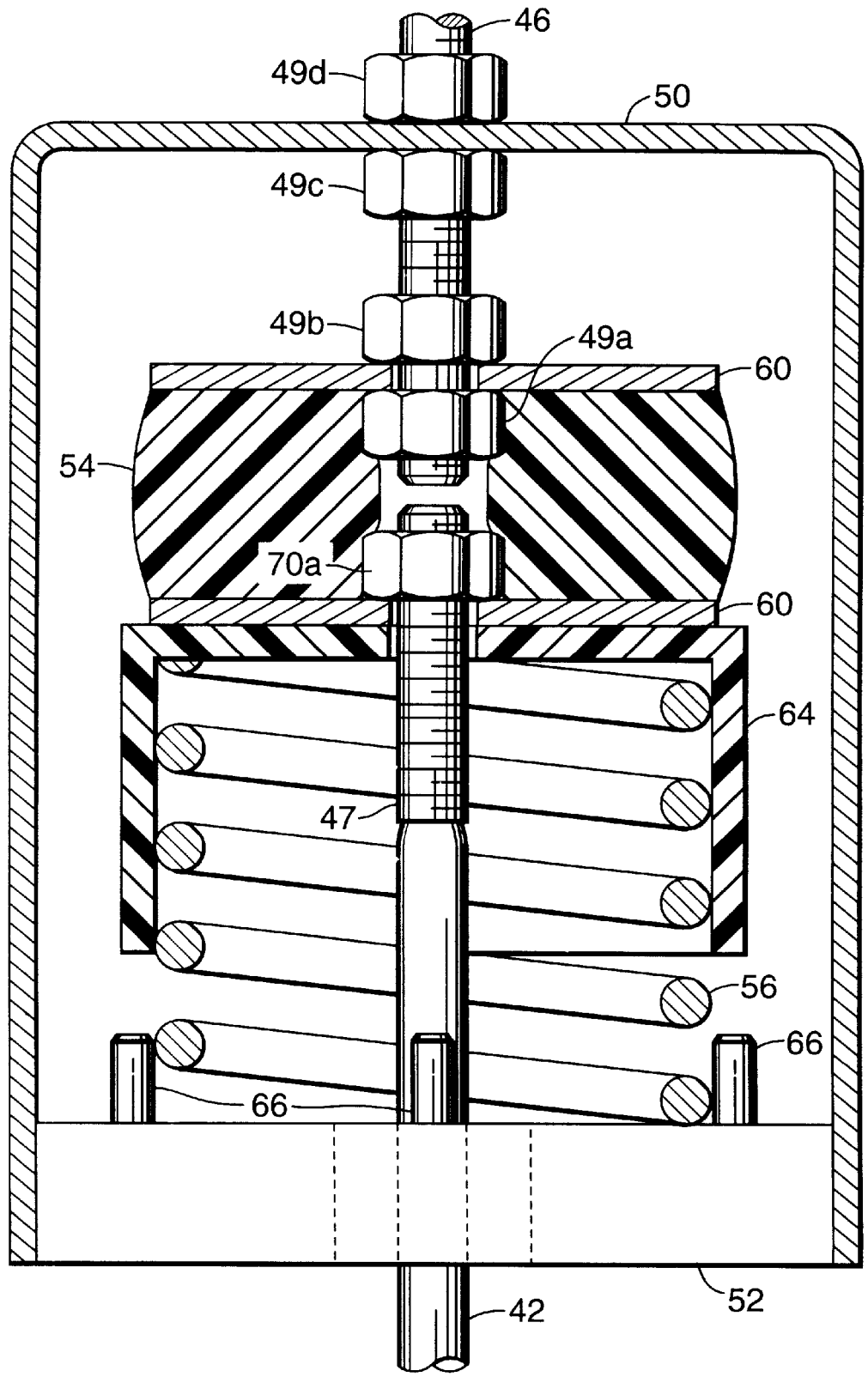
FIG. 6 is a fragmentary longitudinal sectional view of the hanger component of FIG. 2.

FIG. 6 illustrates details of the hanger component 20. The lower threaded metal ferrule 46 passes through the bale frame 50 and the top load spreading, and compression washer 60. One of the adjusting and fastening nuts 49a is placed on the end of the threaded metal ferrule 46 and snugly fitted into the hole of the donut-shaped elastomer damper spring 54. A second fastening nut 49b is run down the threaded metal ferrule 46 to lock the washer 60 between the two nuts 49a, 49b.

A third fastening nut 49c rests on the underside of the bale frame 50 such that when it is tightened against the bale frame 50, it compresses the donut-shaped elastomer damper spring 54, and the isolation spring 56, by an amount in proportion to their respective spring rates, the total of which is determined by the distance between the adjusting nut 49c, and the top load spreading, and compression washer 60.

In practice, the amount of precompression of the springs is determined such that the upward vertical deflection of the isolation spring 56, as the spring unloads due to the cyclic dynamic forces superimposed on its static deflection by the operating vibratory equipment, is of an amount to always allow some precompression to exist. Finally, the fourth fastening nut 49d is tightened against the top of the bale frame 50, to lock the isolation spring assembly in place after it has been adjusted to the desired precompression height.

The elastomer protective boot 64, shown placed over the steel coil isolation spring 56, is primarily used to reduce any clicking noise that may occur between the top coil of the isolation spring 56, and the bottom load spreading-compression washer 60. This clickingn lose can occur as the spring loads and unloads during operation, and which may cause some relative rocking or sliding motion between these parts. The elastomer protective boot 64 may be omitted if no objectionable clicking noise is present.

The centering pins 66 can be seen inserted into the bale weight 52, to locate the isolation spring 56 in the center of the bale. While FIG. 6 implies the use of four centering pins 66 (one at each 90° around a circumference of the coil spring 56), two or three pins may also be used.

The suspension cable segment 42 passes up through the hole in the center of the bale weight 52 and is connected to the bottom of the upper threaded metal ferrule 47, which in turn, passes through the bottom load spreading-compression washer 60. The cable segment 42 is held in place by a fastening nut 70a on a top side of the bottom compression washer 60. A second fastening nut (not shown), may be placed on the upper threaded metal ferrule 47, and tightened to the underside of the bottom compression washer 60, to make a more secure connection if required. The function of the bale weight 52 is to lower the natural frequency of the horizontal bending mode of the hanger component 20, such that it is well away from the operating frequency of the vibratory equipment, to prevent unwanted motion or whipping of the cables.

The spring rate of the isolation spring 56 is selected such that the static weight of the vibratory equipment causes the isolation spring 56 to compress by a deflection of between 0.75 inches and 1.5 inches. With spring rates of the static isolation spring 56 within this range, the vertical superimposed dynamic forces from the operating vibratory equipment are absorbed in deflecting the isolation spring 56, such that only minimal force is transmitted to the support structure. Likewise, dynamic horizontal force components are absorbed by the pendular deflection of the isolation cable assembly. The donut-shaped elastomer damper spring 54 prevents unwanted motion of the isolation spring 56 due to the vibratory equipment's operating frequency being close to any of the natural frequencies of the bending modes of the isolation spring 56, by applying an opposing load to any such motion. Of particular importance is the fact that the vertical spring rate of the isolation spring 56 is virtually unaffected by the application of the elastomer damper spring 17, thus maintaining its vertical isolation efficiency.

Since adjusting the position of the adjusting nut 49c on the threaded metal ferrule 46 also raises or lowers the bale height, it provides a convenient means to make fine height adjustments, that can be used to accurately level the vibrating equipment during the equipment installation process.

Figure 4:
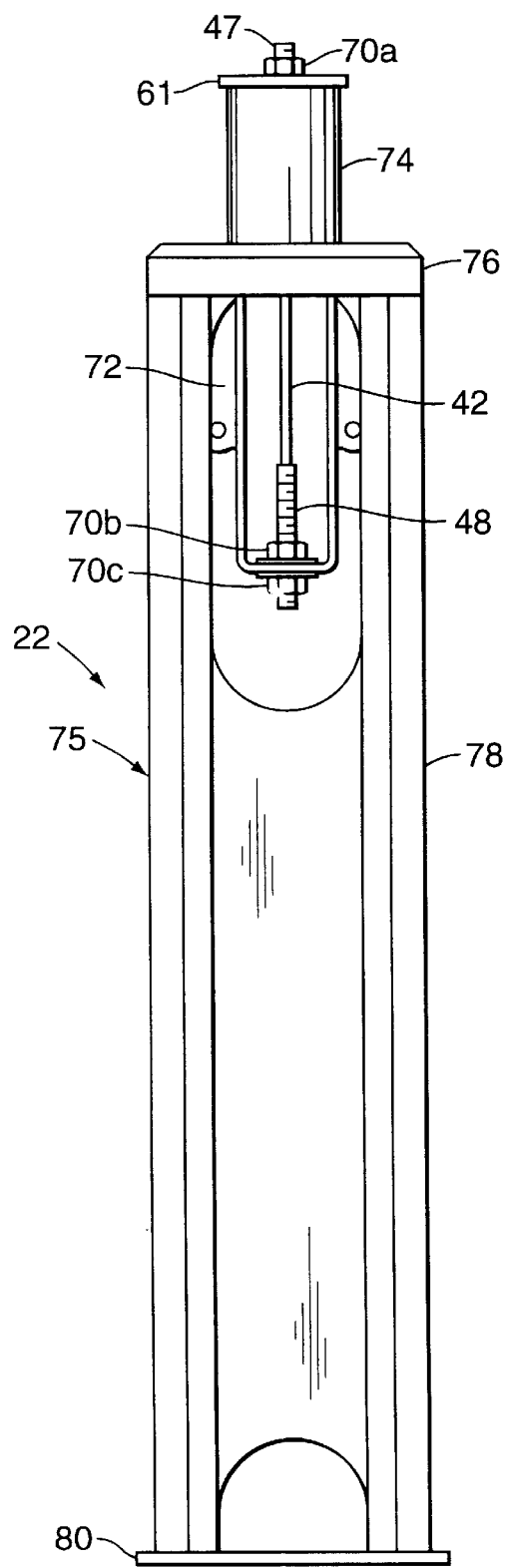
FIG. 4 is a front elevational view of a support component of the suspension system.
Figure 5:
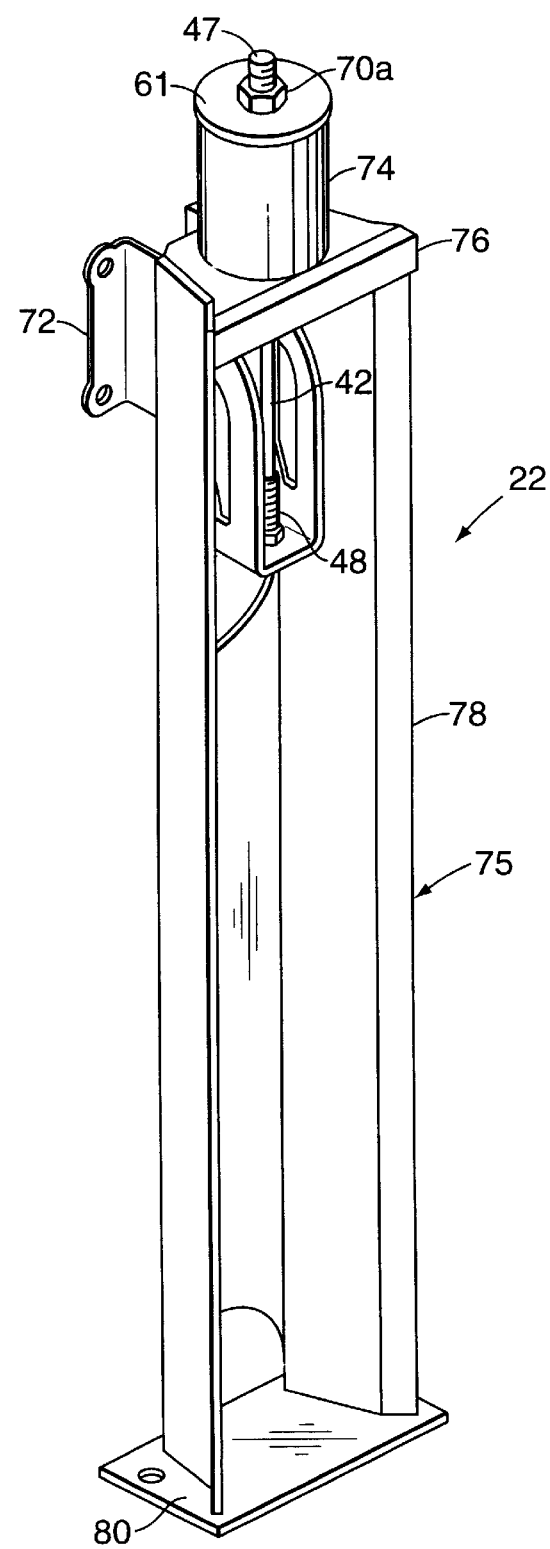
FIG. 5 is a perspective view of the support component of FIG. 4.
Figure 7:
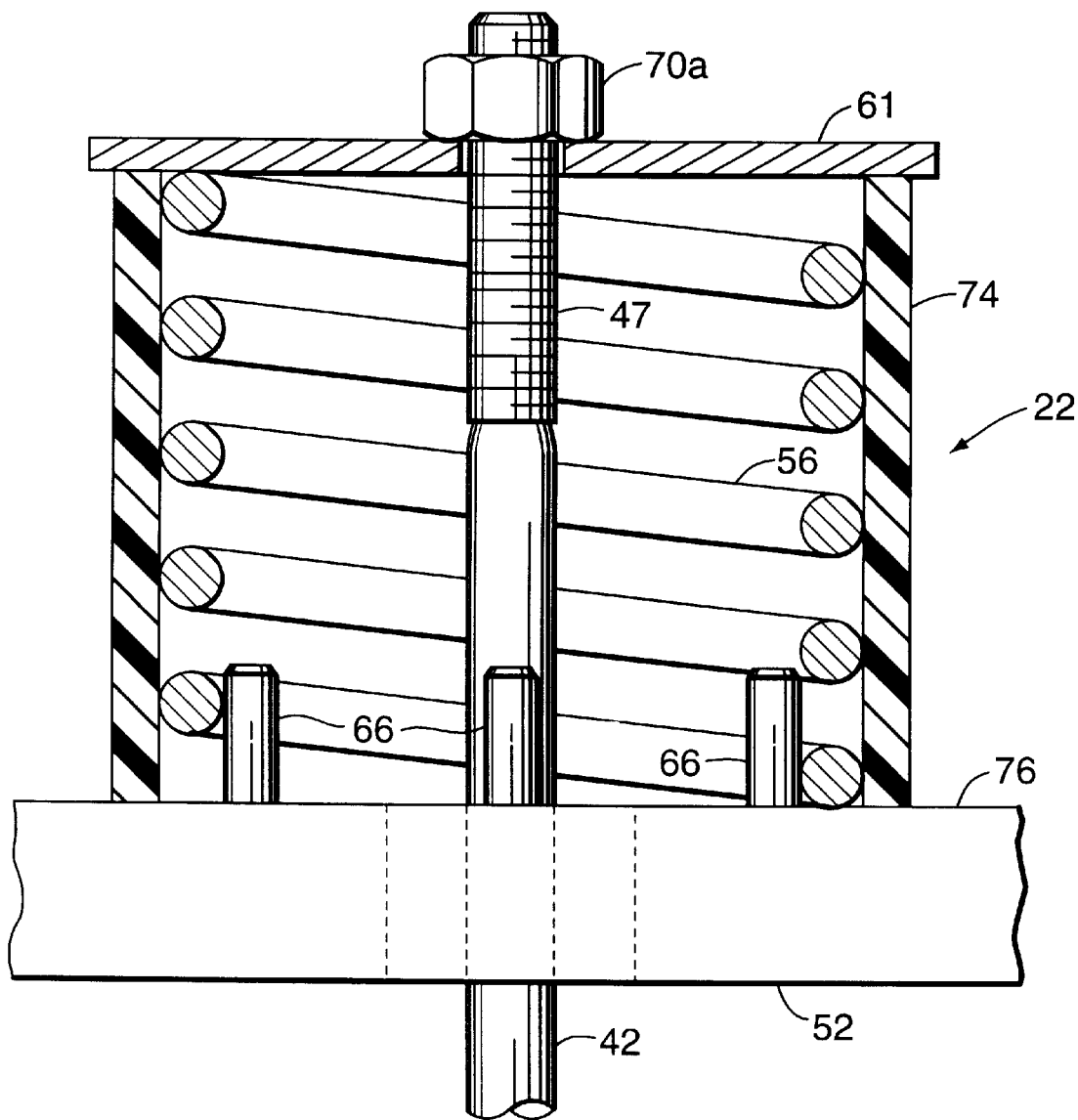
FIG. 7 is a fragmentary longitudinal sectional view of the support component of FIG. 4.

As illustrated in FIGS. 4, 5, and 7 the invention can also be applied to a base mounted isolation system. In the description of this alternate embodiment, like elements carry like indicator numerals as to the previous embodiment.

The wire rope segment 42 is connected between the threaded metal ferrules 47, 48 such that the metal ferrules 47, 48 are connected to each end of the wire rope segment 42 by swaging the wire rope into the ferrule, or by other suitable means. The adjusting and fastening nuts 70a, b, c are used on the threaded metal ferrules 47, 48 to connect the wire rope segment 42 between a top of a load spreading washer 61 and a bottom of an inverted conveyor isolation connecting bracket 72. An alternate damper spring 74 is used which surrounds the isolation spring 56. The damper element 74 comprises a cylinder-shaped elastomeric block. The damper element 74 is arranged to be compressed in a parallel spring circuit, with the isolation spring 56, by the washer 61. The damper element 74 opposes excessive amplitudes of the isolation spring, by opposing a compression of the isolation spring 56.

The pins 66 can be located within an inside circumference of the isolation spring 56 to guide and locate the spring 56. Alternately, the damper element 74 can be located inside the spring 56 and the pins located outside the spacing 56.

A floor stand 75 includes a formed metal mounting plate 76, a formed metal column wall 78, and the base mounting plate 80, assembled together by welding. The formed metal mounting plate 76 provides a support means for the elastomer damper element 74 and the isolation spring 56. The pins 66 are carried by the mounting plate 76. The formed metal column wall 78 may be of any reasonable height that is determined solely by deflection considerations due to the natural frequencies of the column, and by the installation requirements for the conveyor application. Holes in a base mounting plate 80 provide means to lag the floor stand 75 to a support foundation such as a concrete floor, or a steel structure.

To accommodate the base mounted isolation systems 22, the conveyor isolation connecting brackets 72 are inverted and, in the case of the illustrated vibratory conveyor, bolted to the wing plate assemblies 30 or to isolation system mounting plates similar to 33.

The housing formed by the bale frame 50 and bale weight 52 is not required for the support component 22 as the isolation spreading assembly is mounted directly on the floor stand assembly 75, which is securely fastened to a floor structure of some type and is not free to move about when the vibratory equipment is in operation.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A vibration isolation component for connecting a vibrating structure to a relatively non-vibrating structure comprising:

a spring having a first end and a second end, said spring being compressible and expandable along an axis between said first and second ends, said spring arranged to support the vibrating structure from the non-vibrating structure; and a damper element arranged adjacent one of said first or second ends and arranged to impart a resilient force opposing expansion of said spring, and to impart a resilient force for compression of said spring, expansion of said spring causing compression of said damper element and compression of said spring allowing expansion of said damper element, said spring and said damper element being arranged for the spring to support the vibrating structure at a position located between the spring and the damper element.

2. The isolation component according to claim 1, wherein said damper element comprises an elastomer ring.

3. The isolation component according to claim 1, further comprising a housing surrounding said spring and said damper element and including a first wall adjacent to said second end of said spring, and said damper element is arranged adjacent said first end, and said housing comprises a second wall opposite said first wall, said damper element braced against said second wall, expansion of said spring being opposed by compression of said elastomer damper.

4. The isolation component according to claim 3, comprising
a connector which is connected to said first end of said spring and extending past said first wall, said connector moving in a direction from said first end toward said second end to compress said spring under load.

5. The isolation component according to claim 1, wherein said damper element comprises an elastomer block.

6. The isolation component according to claim 1, wherein said spring comprises a coil spring.

7. The isolation component according to claim 6, wherein said damper element comprises an elastomer ring.

8. A vibration isolation component for connecting a vibrating structure to a relatively non-vibrating structure comprising:
a spring having a first end and a second end, said spring being compressible and expandable along an axis between said first and second ends, said spring arranged to support the vibrating structure from the non-vibrating structure;
a damper element;
wherein said damper element comprises an elastomer ring;
a housing surrounding said spring and said damper element and including a first wall adjacent to said second end of said spring, and said damper element is arranged adjacent said first end, and said housing comprises a second wall opposite said first wall, said damper element braced against said second wall, expansion of said spring being opposed by compression of said damper element;
a connector which is connected to said first end of said spring and extending past said first wall, said connector moving in a direction from said first end toward said second end to compress said spring under load; and
wherein said first wall comprises a weight sized to lower the natural frequency of the horizontal bending mode of the component such that said natural frequency is substantially unequal to the operating frequency of the vibratory equipment held by the component.

9. A vibration isolation component for connecting a vibrating structure to a relatively non-vibrating structure comprising:
a spring having a first end and a second end, said spring being compressible and expandable along an axis between said first and second ends, said spring arranged to support the vibrating structure from the non-vibrating structure;
a damper element; and a housing surrounding said spring and said damper element and including a first wall adjacent to said second end of said spring, and said damper element is arranged adjacent said first end, and said housing comprises a second wall opposite said first wall, said damper element braced against said second wall, expansion of said spring being opposed by compression of said damper element;
a ferrule arranged through said second wall, a compression washer overlying said damper element, said ferrule connected to said compression washer and threadingly adjustable in length between said second wall and said compression washer.

10. The isolation component according to claim 9 comprising nuts threaded on said ferrule on opposite sides of said second wall to adjust and fix said length between said second wall and said compression washer.

11. The isolation component according to claim 9 comprising a wire rope for supporting said housing and connected to said ferrule.

12. A vibration isolation component for connecting a vibrating structure to a relatively non-vibrating structure comprising:
a spring having a first end and a second end, said spring being compressible and expandable along an axis between said first and second ends, said spring arranged to support the vibrating structure from the non-vibrating structure;
a damper element having a cylindrical configuration and arranged surrounding said spring with a radial clearance therebetween and arranged to impart a resilient force against contraction of said spring; and
wherein said damper element and said spring are supported from said non-vibrating structure on bottom ends thereof, and comprising an elongate member connectable to the vibrating structure, and a compression washer, said elongate member connected to said compression washer, said compression washer located above and against top ends of said spring and said damper element, downward force on said elongate member acting to compress said spring and said damper element.

13. The isolation component according to claim 12, comprising a column mountable in a vertical posture to said non-vibrating structure, said column having a surface for supporting said bottom ends of such spring and said damper element.

14. The isolation component according to claim 13 wherein said damper element comprises a cylinder shaped elastomeric block and said spring comprises a coil spring, said elastomeric block arranged coaxially with said coil spring.

15. A vibration isolation component for supporting a vibrating structure comprising:
an isolation spring having a first portion supportable by external support structure and a second portion adapted to support a vibrating structure, and having a spring resiliency between said first portion and said second portion; and le;2qa damper element arrangeable between said external support structure and the vibrating structure to impart a resilient force against relative movement between said first portion and said second portion, said damper element having a cylindrical configuration surrounding said isolation spring and spaced radially outwardly therefrom preventing excessive amplitude of the isolation spring during operation of the vibrating structure at a frequency close to any of the natural frequencies of bending modes of the isolation spring, without substantially changing vertical spring rate of the isolation spring.

16. The isolation component according to claim 15 wherein said damper element comprises an elastomeric block.

17. The isolation component according to claim 16, wherein said damper element and said elastomeric block are arranged as spring elements in a parallel circuit to be located between said support structure and said vibrating structure.

18. A vibration isolation component for supporting a vibrating structure comprising:

an isolation spring having a bottom end and a top end adapted to support a vibrating structure, and having a spring resiliency between said bottom end and said top end;

a damper element arranged between said external support structure and the vibrating structure to impart a resilient force against movement between said bottom end and said top end; and wherein said isolation spring comprises a coil spring and said damper element comprises a cylindrical elastomeric element surrounding said coil spring with an annular gap between an outside of said coil spring and an inside of said elastomeric element; and said component comprises an elongate member and a compression washer, said elongate member connected to said compression washer at a first end and connectable to the vibrating structure at a second end thereof, said compression washer overlying said coil spring on said top end of said coil spring, and a frame supportable from external support structure; and said coil spring arranged to be supported by said frame on said bottom end of said coil spring, said coil spring and said elastomeric element compressed by a downward load on said elongate member via said compression washer, said elastomeric element arranged between said top end of said coil spring and said frame to inhibit movement of said top end of said coil spring.

19. The isolation component according to claim 18, wherein said elastomeric (block) element is positioned against said compression washer.

* * * * *